(12) United States Patent
Böke et al.

(10) Patent No.: US 11,253,738 B2
(45) Date of Patent: Feb. 22, 2022

(54) WATER EXTINGUISHING SYSTEM AND ASSOCIATED METHOD FOR CONTROLLING THE WATER EXTINGUISHING SYSTEM

(71) Applicant: Minimax Viking Research & Development GmbH, Bad Oldesloe (DE)

(72) Inventors: Joachim Böke, Düsseldorf (DE); Frank Friede, Bad Oldesloe (DE); Stephan Bludau, Bad Oldesloe (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

(21) Appl. No.: 16/930,892

(22) Filed: Jul. 16, 2020

(65) Prior Publication Data

US 2020/0376312 A1 Dec. 3, 2020

Related U.S. Application Data

(63) Continuation of application No. PCT/EP2019/071299, filed on Aug. 8, 2019.

(30) Foreign Application Priority Data

Aug. 14, 2018 (DE) ..................... 10 2018 119 776.4

(51) Int. Cl.
*A62C 37/50* (2006.01)
*A62C 99/00* (2010.01)
(Continued)

(52) U.S. Cl.
CPC .............. *A62C 37/50* (2013.01); *A62C 35/68* (2013.01); *A62C 99/0072* (2013.01); *G01F 1/00* (2013.01)

(58) Field of Classification Search
CPC ........ A62C 37/50; A62C 99/0072; G01F 1/00
(Continued)

(56) References Cited

U.S. PATENT DOCUMENTS 5,950,150 A 9/1999 Lloyd et al.
8,573,315 B1 11/2013 Taylor
(Continued)

FOREIGN PATENT DOCUMENTS

DE 84 27 006 U1 2/1985
DE 44 39 882 C2 5/1996
(Continued)

OTHER PUBLICATIONS

International Searching Authority, International Search Report in German & English translation in International Appln. No. PCT/EP2019/071299, dated Nov. 21, 2019, 5 pages.
International Searching Authority, Written Opinion in German & English translation in International Appln. No. PCT/EP2019/071299, dated Nov. 21, 2019, 10 pages.

*Primary Examiner* — Jason J Boeckmann
(74) *Attorney, Agent, or Firm* — Perkins Coie LLP

(57) ABSTRACT

The invention relates to a water extinguishing system (1) with a fluid supply (20), a pump (30) and a test line (40) with an opening element (2) which is configured to open the test line (40) during a test run of the pump (30). According to the invention, the test line (40) further comprises a closing element (4) which is configured to close the test line (40) if the water extinguishing system (1) is triggered.

20 Claims, 6 Drawing Sheets

(51) Int. Cl.
*G01F 1/00* (2022.01)
*A62C 35/68* (2006.01)

(58) Field of Classification Search
USPC ........................................................ 169/5–18
See application file for complete search history.

(56) References Cited

U.S. PATENT DOCUMENTS

| | | | |
|---|---|---|---|
| 9,375,595 B2 | 6/2016 | Taylor | |
| 2009/0188567 A1* | 7/2009 | McHugh | A62C 37/50 |
| | | | 137/15.05 |
| 2011/0054828 A1* | 3/2011 | Junk | G05B 23/0256 |
| | | | 702/125 |

FOREIGN PATENT DOCUMENTS

| | | | |
|---|---|---|---|
| DE | 10 2005 024 170 A1 | 11/2006 | |
| DE | 10 2008 050 126 A1 | 7/2010 | |
| DE | 10 2006 032 648 B4 | 6/2014 | |
| EP | 1 307 266 B1 | 3/2006 | |
| EP | 1721639 A1 * | 11/2006 | ............. A62C 37/50 |
| EP | 1721639 A1 | 11/2006 | |
| EP | 1 972 793 B1 | 7/2010 | |
| GB | 2 280 369 B | 3/1997 | |
| JP | H06 86838 A | 3/1994 | |
| KR | 20110131948 A | 12/2011 | |

\* cited by examiner

WATER EXTINGUISHING SYSTEM AND ASSOCIATED METHOD FOR CONTROLLING THE WATER EXTINGUISHING SYSTEM

PRIORITY CLAIM AND INCORPORATION BY REFERENCE

Under 35 U.S.C. 120 and 365(c), this patent application is a continuation application of, and claims the benefits and priority to, International Application No. PCT/EP2019/071299, filed Aug. 8, 2019 which the claims the benefit of German Application No. 10 2018 119 776.4 filed Aug. 14, 2018, which applications are incorporated by reference in their entirety.

TECHNICAL FIELD

The present invention relates to a water extinguishing system and a method for controlling such a water extinguishing system. Water extinguishing systems according to the invention are in particular sprinkler, water spray and foam extinguishing systems, wherein the invention is not limited to special types of water extinguishing systems.

The present invention relates in particular to water extinguishing systems comprising a) a fluid supply for providing an extinguishing fluid, b) at least one pump which is configured to conduct the extinguishing fluid from the fluid supply into a distribution pipe and c) a test line which branches off from the distribution pipe and is configured to conduct the extinguishing fluid pumped by the pump, the test line having an opening element which is configured to open the test line during a test run of the pump.

BACKGROUND AND SUMMARY OF THE INVENTION

Water extinguishing systems of this type are subject to the regulations described in VdS 2212, among others. In particular, paragraph 1.3.4 of VdS 2212 provides for weekly inspections of the water extinguishing system by the system operator. Among other things, the weekly tests include a check of the pump start of the pump which is used to pump the extinguishing fluid. For this, a test run must be carried out, which must continue until the normal operating parameters of the pump are reached.

In such water extinguishing systems the test line is provided for this purpose, enabling a pump test to be carried out while preventing the extinguishing fluid from causing weekly flooding of the areas monitored by the water extinguishing system during the weekly required pump test of the pump.

In this context, fluid supply means a combination of one or more elements which serve to supply the water extinguishing system with extinguishing fluid. For this purpose, the extinguishing fluid supply may in particular comprise a drinking water supply from which drinking water can be supplied to the water extinguishing system as extinguishing fluid. Alternatively or additionally, the extinguishing fluid supply may comprise a reservoir in which the extinguishing fluid can be stored. In some embodiments, the test line is configured in such a way that it conducts the extinguishing fluid flowing through it back into a storage tank and/or an intermediate tank which is configured as part of the fluid supply. This means that the extinguishing fluid passing through the test line during the test run can still be used by the water extinguishing system. In some embodiments, the extinguishing fluid passing through the test line may also be conducted into a waste water tank and/or discharged via a waste water pipe and not stored.

According to the prior art, the weekly test run of the pump is carried out by hand, i.e. manually, by a trained person. For this purpose, the test line is first released by opening the opening element. A starting device is then used to trigger a pump start of the pump. This start may be automatic or performed manually. The starting pressure, which is the pressure at the time the pump is started, is then measured and recorded and the test run is carried out until the normal operating parameters of the pump drive motor are reached. The test line is then closed again by means of the opening element and no further extinguishing fluid can enter the test line.

In the context of this document the usual technical definitions according to, for example, VdS CEA 4001:2014-04 are assumed.

In particular, a test line is understood here to be a water measuring device comprising a flow meter, stilling pipe and regulating valves for testing the water rate. The test line is preferably provided as a branch line from the distribution pipe which is positioned behind the pump and serves to supply the pipe network.

An alarm valve station describes in particular an assembly comprising an alarm valve and all associated valves and accessories for controlling a sprinkler group.

A distribution pipe describes in particular a pipe that either directly feeds a branch pipe or a single sprinkler on a branch pipe that is not a tailpipe and is longer than 300 mm.

The term extinguishing fluid is thus understood to refer to a fluid which is used to extinguish and/or fight fires. This extinguishing fluid may in particular be extinguishing water provided with or without additives. In some embodiments the extinguishing fluid may comprise in particular a foam, an anti-freezing agent or similar. If possible, the additives should be selected so as to be optimal for the respective application of the water extinguishing system. In some embodiments, the extinguishing fluid may also be pure extinguishing water. Other extinguishing fluids are also conceivable.

In this context, an opening element can be understood in particular to be a sliding element within an opening unit, such as a valve, which can be operated manually in accordance with the prior art. Opening is effected by moving the sliding element from a closing to an opening position. Opening the closing element in the test line enables a volume flow through the test line by means of which the test run can be carried out. Closing is then effected by moving the sliding element from the opening position into the closing position. This interrupts the volume flow through the valve again.

When a test run is carried out, there is a risk that during the test run a fire occurs and the water extinguishing system is triggered. In such a case, the available amount of extinguishing fluid delivered by the pump is reduced by the amount of water flowing through the open or unclosed test line. This indifferent state has so far prevented the labor-intensive weekly inspections from being automated and leads to an increased risk of an improper supply of the water extinguishing system with extinguishing fluid, for example due to human error. In particular, the need to close the test line manually increases the risk that the person responsible for servicing the sprinkler will actually close it.

Against this background, one of the objects of the present invention was to reduce the effort required to inspect the water extinguishing system. Furthermore, it was an object to improve the reliability and efficiency of water extinguishing in a water extinguishing system of the type mentioned initially. It is also an object of the invention to reduce the risk of an undersupply of extinguishing fluid to the water extinguishing system.

According to the invention, this object is solved by a water extinguishing system of the type mentioned above, where the test line has a closing element which is configured to close the test line when the water extinguishing system is triggered.

Here, the water extinguishing system may be triggered in particular in response to the detection of a fire. The term "detection" is to be understood broadly and can include determining a fire parameter by means of a sensor, in particular a sensor of a fire detector. Alternatively or additionally, this may also mean a temperature-dependent opening of one or more nozzles, in particular one or more sprinklers.

When a fire parameter is determined by means of a sensor, the detection of the fire is passed on to a central unit, in particular a fire reporting and/or extinguishing control center (FACU—fire alarm control unit) which then triggers the water extinguishing system by means of a corresponding trigger signal. In this case, the FACU may in particular transmit a corresponding control signal that causes the closing element to be activated. Here, the FACU may transmit the control signal directly to the closing element and thus control the closing element directly, or it may transmit the control signal to a control unit, which in turn controls the closing element in response to the control signal. In some embodiments, the control signal that causes the closing element to be activated may also be generated and transmitted directly by the control unit itself, independently of the FACU. Other variants in which the closing element is activated by other units within the system are also conceivable.

Alternatively or additionally, the opening of the nozzles may also be used to activate the closing element, either through triggering of the water extinguishing system by the FACU or directly at the nozzle itself dependent on the temperature. In particular, a trigger switch within the pipe network can be used for this purpose. A trigger switch is any type of switch that is activated—and, in particular, switches—when the water extinguishing system is triggered. This means that the trigger switch is especially configured to trigger, i.e. switch, in response to, for example, a smoke alarm, a pressure drop within the pipe network, a change in the fluid flow within the pipe network and/or due to other fire-related influences within, outside and/or in the surroundings of the water extinguishing system.

In some embodiments, the trigger switch may be designed in particular in the form of a pressure switch or a flow switch. Here, use is made of the fact that if one or more nozzles are opened, the pressure and the fluid flow within the pipe network change abruptly. This can lead to the switching of a pressure switch and/or a flow switch used as a trigger switch. This switching of the trigger switch may then be used to activate the closing element. The closing element is activated automatically as soon as the water extinguishing system is triggered. In this context, activation is understood to mean that the closing element is moved into a position that locks the fluid flow through the test line.

This means that the activation causes an immediate interruption of the volume flow through the test line, such that the entire fluid quantity is available in the pipe network. This ensures that the water extinguishing system is sufficiently supplied with water. This means that in addition to the opening element, which serves to provide and interrupt the volume flow into the test line, a second, redundant element, namely the closing element, is provided to interrupt the fluid supply to the test line.

In this way, it is no longer necessary for trained personnel to be permanently on site in the event of a test run, in order to manually interrupt the test run in the event of a fire, thus allowing for the test run to be automated. If the test run is automated the above-mentioned procedure is thus carried out automatically, i.e. no longer manually by the appropriate personnel. This means that the test run may on one hand be initiated "at the push of a button." In such a case, a user can determine when a test run should be initiated. Alternatively or additionally, the test run may also be automated to the extent that it starts automatically at predetermined time intervals, for example every week. In such a case, the opening element in particular is no longer operated manually, but is automatically opened and—after the test run is complete—closed again. This may be done, for example, by means of an appropriate motorized slide valve. However, other methods of opening and closing the opening element are also conceivable. Alternatively or additionally, it may of course also be provided that the opening element may still be operated manually, for example to carry out unscheduled test runs or simply to continue to leave the initiation of the test run to trained personnel. However, even in this case the personnel does not have to be present for the entire time of the test run to monitor the test run, but can turn to other tasks for the duration of the test run after opening the opening element. This can significantly reduce the effort and security measures involved in carrying out the test run.

According to a preferred embodiment, the closing element is configured to move upon triggering of the water extinguishing system from an unlocking position to a locking position, in which the closing element closes the test line, where the locking position corresponds to an energetically favorable home position of the closing element.

The position in which the closing element locks the fluid flow through the test line is called the locking position. Correspondingly, the position in which the closing element allows fluid flow through the test line is called the unlocking position. The closing element is preferably configured to move from the unlocking position into the locking position when activated. Preferably, the locking position of the closing element corresponds to the energetically advantageous base state of the closing element, since thereby the switching of the trigger switch may be used in a particularly advantageous way for automatic activation of the closing element.

For this purpose, when starting the test run of the pump, a corresponding signal is applied to the closing element, for example by the control unit which also controls the test run, where such signal moves the closing element into the unlocking position in which the fluid flow through the test line is open. The output of this signal keeps the closing element in the unlocking position. If the trigger switch switches, this signal is interrupted by the switching. Thus, the closing element no longer receives a signal that keeps it in the unlocking position and therefore moves immediately back to the locking position in which the closing element locks the fluid flow through the test line. This ensures that the closing can be achieved independently of energy, i.e. also in the event of a power failure, since the closing element moves directly into the locking position in such a case as well.

In a preferred embodiment of the invention, the distribution pipe comprises a distribution pipe shutter configured to interrupt a fluid flow through the distribution pipe during a test run of the pump, where the distribution pipe shutter is further configured to release the fluid flow through the distribution pipe upon activation of the water extinguishing system.

In some embodiments of the invention it is necessary to interrupt the extinguishing fluid supply to the water extinguishing system through the distribution pipe when carrying out a pump test run, for example to prevent the trigger switches within the pipe network from switching due to pressure surges.

For this purpose, the water extinguishing system may preferably comprise a distribution pipe shutter. The distribution pipe shutter is arranged within the distribution pipe. In its base state, the distribution pipe shutter is in a flow position, thus allowing the extinguishing fluid to flow through the distribution pipe to the extinguishing fluid outlets, such as the nozzles. This means that, if there is no opposing control/trigger, the distribution pipe shutter is in the position in which the extinguishing fluid outlets can be constantly supplied with extinguishing fluid via the distribution pipe.

When the pump test run is started, the distribution pipe shutter is moved accordingly from the flow position into the shut-off position and the fluid flow through the distribution pipe is interrupted. If the pump test run ends as scheduled, the distribution pipe shutter is released after the test run is completed and moves back to the flow position. This ensures that a reliable supply of extinguishing fluid can be provided for water extinguishing systems that would otherwise run dry due to the test runs of the pump.

If the test run of the pump ends unexpectedly, the distribution pipe shutter receives a corresponding signal, preferably an automated signal, which moves the distribution pipe shutter from the shut-off position into the flow position. In this case, as well, a fluid flow of sufficient extinguishing fluid in the direction of the extinguishing fluid outlets is made possible.

In some embodiments, the distribution pipe shutter may be implemented in particular by means of a slide valve which, in the shut-off state, is pushed into the distribution pipe and closes it in such a way that no fluid can pass through the slide valve.

Alternatively, the distribution pipe shutter may be designed in such a way that it does not completely shut off the fluid flow during the test run of the pump, but only absorbs pressure surges occurring during the test run. In this case, the distribution pipe shutter can be designed in particular in the form of a pressure release device. For example, the distribution pipe shutter may comprise a pressure equalization valve or a pressure relief valve. In the event of a pressure surge, these valves then serve to equalize the pressure inside the distribution pipe, thus preventing a pressure surge from activating the trigger switches inside the pipe network while the pump is in operation.

According to a particularly preferred embodiment, the closing element and the distribution pipe shutter can also be designed as a single closing element. Such an embodiment may be realized in particular in the form of a ⅔-way valve and/or a ⅔-way ball valve, which is arranged within the junction of the test line and the distribution pipe and can be switched between two positions. In this case, the closing element is thus designed to be either in the unlocking/shut-off position, in which the fluid flow through the test line is released and the fluid flow into the distribution pipe is interrupted, or in the locking/flow position, in which the fluid flow through the distribution pipe is released but the fluid flow through the test line is locked.

In particular, the closing element is configured in such a way that, in the energetically more favorable base state, it locks the test line and releases the distribution pipe, i.e. it is in the locking/flow position. In this way, it can be ensured that the supply of the pipe network is guaranteed even in the event of a power failure.

According to another embodiment, the opening element and/or the closing element and/or the distribution pipe shutter can be controlled automatically. In some embodiments, the test run and the corresponding shutdown of the same in the event of fire may be fully or partially automatic by automatically controlling one or more of the opening element, the closing element and/or the distribution pipe shutter. The control can be effected either by a dedicated control unit or by a control unit that controls the test run. Alternatively or additionally, the control can also be performed by the FACU. This means that it is not necessary to provide trained personnel to carry out the test run.

In some embodiments, the elements may also be controlled automatically only in part. For example, the opening element can first be opened manually by a user. In some embodiments, the distribution pipe shutter can also be closed manually. If the water extinguishing system triggers, the activation of the closing element—i.e. the closing of the test line—and the turning-off of the distribution pipe shutter—i.e. the opening of the fluid flow through the distribution pipe—can be effected automatically by an appropriate control and no manual operation is required. In this case, it is not necessary for any trained personnel to remain at the water extinguishing system after the test run has started.

In a preferred embodiment, the water extinguishing system also comprises a first trigger switch, which is configured to close the test line by means of the closing element when the water extinguishing system is triggered.

It is preferred that the closing element is activated by means of a trigger switch. As already mentioned, triggering the water extinguishing system leads to a drop in pressure inside the pipe. This pressure drop then switches the trigger switch, which in turn activates the closing element.

For this purpose, the trigger switch should be connected to the signal line, which communicatively connects the control unit and the closing element. When starting the pump test run, the control unit (among other things) outputs a signal that moves the closing element from the energetically more favorable locking position into the unlocking position. As long as this signal is applied to the closing element, the closing element is held in the unlocking position. If the trigger switch switches, this switching causes an interruption of the signal between the control unit and the closing element and the closing element immediately moves back into the locking position.

The same principle can also be used for the distribution pipe shutter. For this purpose, the distribution pipe shutter must be configured in such a way that, in the energetically more favorable base state, it is arranged in a flow position in which the fluid flow through the distribution pipe is released. By means of a transmission of a signal by the control unit, the distribution pipe shutter is then moved to a shut-off position in which the fluid flow through the distribution pipe is locked. The signal keeps the distribution pipe shutter in the shut-off position. When the water extinguishing system is triggered and the trigger switch is switched accordingly, the signal is interrupted by the switching, thus causing the distribution pipe shutter to move into the flow position.

In another preferred embodiment, the water extinguishing system comprises an alarm valve, where the alarm valve comprises the first trigger switch.

According to a further embodiment of the invention, the trigger switch, which is configured to close the closing element when the water extinguishing system is triggered, is arranged on an alarm valve.

Both passive and active alarm valves are understood to be alarm valves according to the invention. The best-known examples of these alarm valves are wet and dry alarm valves and spray water valves.

A passive alarm valve is a valve that opens autonomously when the pressure in the pipe network changes. An active alarm valve is a valve which, after receiving a corresponding signal from external fire detection means, such as the fire detectors mentioned at the beginning, or as a function of external control interventions, actively releases the fluid flow by opening the locking element and triggers an alarm.

An alarm valve is also called an alarm valve station. In water extinguishing systems, alarm valve stations are located between the nozzles, in particular the sprinklers, for the outlet of the extinguishing water and the water supply.

In another embodiment, the trigger switch is arranged on the distribution pipe downstream from the position where the test line branches off.

In some embodiments, the trigger switch, which is configured to close the test line by means of the closing element if the water extinguishing system is triggered, is arranged on the distribution pipe. In this case, the trigger switch is preferably arranged in the fluid direction downstream of the position where the test line branches off from the distribution pipe. Preferably, the trigger switch is arranged in the immediate vicinity of the junction position, i.e. only a small distance away from it.

When the water extinguishing system is triggered, e.g. pressure, flow rate and similar parameters change within the pipe network and thus also within the distribution pipe. This allows the trigger switch to be arranged at this point in the water extinguishing system as well—and not at the alarm valve. This allows the trigger switch to be brought closer to the closing element within the test line. The trigger switch may be arranged in particular downstream of a non-return flap, which may be positioned between the test line and the distribution pipe.

In a preferred embodiment, the water extinguishing system also comprises a fire reporting and/or extinguishing control center, where the fire reporting and/or extinguishing control center is configured to close the test line by means of the closing element if the water extinguishing system is triggered.

In a further embodiment of the invention, the fire reporting and/or extinguishing control center (FACU—fire alarm control unit) may also be used to activate the closing element and thus to interrupt the supply to the test line. For this purpose, it is in particular provided that the closing element will be in communicative connection with the FACU. In particular, there may be a signal connection between the closing element and the FACU, in particular in the form of a signal line, where the FACU transmits an activation signal to the closing element, which causes the closing element to immediately close the supply to the test line in order to make the extinguishing water completely available to the water extinguishing system. This causes a particularly quick interruption of the test run and thus enables as efficient a supply of extinguishing fluid as possible when the water extinguishing system is triggered.

In a further embodiment of the invention, the closing element and/or the distribution pipe shutter are formed with at least one of the following closing devices:
a deluge valve,
a pilot-controlled solenoid valve,
a directly controlled solenoid valve, and
a fail-safe motorized slide valve.

The closing element and/or the valve pipe closing element may be designed in different ways. In some embodiments, the closing element and/or valve pipe closing element may be formed with a deluge valve in particular. Such valves are designed to let large quantities of water through in a short amount of time. They are therefore formed with a predetermined operating pressure (between 10 and 16 bar, depending on the nominal diameter) and corresponding predetermined nominal diameters (in particular DN50, DN80, DN100, DN150, DN 200). After opening, such deluge valves can be reset. The advantage of such deluge valves is that they are already certified for use in fire protection.

In some embodiments, the closing element and/or valve pipe closing element may also be equipped with a solenoid valve. A solenoid valve is a valve which is actuated by an electromagnet and also allows very fast switching and resetting. Solenoid valves comprise a sealing element, such as a diaphragm or a piston, which can be moved from an unlocking position (or flow position) into a locking position (or shut-off position) and back into the unlocking position.

Solenoid valves according to the invention may particularly be configured as pilot-controlled solenoid valves. A pilot-controlled solenoid valve requires a pressure difference of the operating pressure in order to open and close. Here, the sealing element is moved by the existing pressure difference from the unlocking position into the locking position and vice versa. With this type of solenoid valve, the actuation by means of an electromagnet only performs a pilot control function, which merely relieves the sealing element. This makes it possible to control high pressures at large nominal diameters even with small magnets.

Solenoid valves may also be configured as directly-controlled solenoid valves. Such solenoid valves use an actuator with an electromagnet. This means that the actuator is directly connected to the sealing element, usually a piston. As long as the electromagnet is activated, the piston is held in the unlocking position. When the actuator is deactivated, the piston is held in the locking position by a compression spring. Furthermore, the direction of flow of the fluid, in this case of the extinguishing water, is usually determined by the valve in such a way that when the valve is closed, the differential pressure building up between the inlet and outlet of the valve additionally presses the piston against the valve seat.

In addition, other valves may also be used as closing element and/or as distribution pipe shutter, such as pinch valves, fail-safe valves and the like.

In a further embodiment, the closing element and/or the valve closing element may be equipped with a fail-safe motorized slide valve, which can close the test line by means of a locking element. This means that the motorized slide valve is activated when the water extinguishing system is triggered and then pushes the locking element into the locking position, thus interrupting the supply to the test line.

It is particularly preferred that the motorized slide valve is configured to be fail-safe. For this purpose, the motorized slide valve may be connected to the power supply and at the same time have a battery or other energy storage device which ensures that the motorized slide valve continues to operate in the event of a power failure. This can prevent that the closing element no longer functions properly in the event of a power failure.

In some embodiments, the trigger of the closing element and/or the distribution pipe shutter is in particular a hydraulic, pneumatic, electric and/or pneumatic-electric trigger.

It is preferred that the closing element, when it is in the energetically most favorable base state, locks the test line. This ensures that the closing element still closes the test line reliably even in the event of a power failure. To cause the closing element to release the fluid flow through the test line, the closing element can be moved out of its energetically favorable state by means of electrical, pneumatic and/or pneumatic-electrical control.

Conversely, it is preferred that the distribution pipe shutter, when it is in the energetically most favorable base state, releases the fluid flow through the distribution pipe. This ensures that the flow of extinguishing fluid to the fluid outlets of the water extinguishing system is guaranteed even in the event of a power outage. The distribution pipe shutter can then be moved out of the energetically favorable state by means of electric, pneumatic or electric-pneumatic control in order to stop the flow of fluid through the distribution pipe.

According to another embodiment, the water extinguishing system also comprises a control unit which is configured to control an automatic test run of the pump.

It is preferred that the test run of the pump can be carried out automatically. For this purpose, the water extinguishing system may according to the invention comprise a control unit which automatically starts and terminates the pump test run and which takes over the control of the pump during the pump test run, i.e. checks when the operating parameters are reached and/or when the test run is to be terminated and/or when the test run of the pump is to be aborted. In this context, termination of the test run by the control unit means that the test run of the pump has been successfully completed and then terminated by closing the opening element and switching off the pump. Aborting the test run of the pump means that a fire event has occurred during the test run and that the test line is being closed during the test run to provide the extinguishing fluid to the water extinguishing system.

In particular, the control unit is configured to automatically start the test run of the pump by first outputting a signal to the opening element, which causes the opening element to release the fluid flow through the test line. The control unit then outputs a signal to the pump starting device of the pump, which ensures that the pressure at the pump starting device is reduced. This lowering of the pressure at the pump starting device starts the pump. The starting pressure, which is the pressure at the time the pump is started, is then measured and recorded and the pump test run is carried out until the normal operating parameters of the pump drive motor are reached. The measured values may be transmitted to the control unit and evaluated and stored by it. The control unit then outputs a signal to the opening element in order to close the test line again. The pump is then switched off by a corresponding signal from the control unit. The control unit is thus configured to perform the test run of the pump automatically. For this purpose, the control unit is preferably set to automatically perform the test run of the pump at regular time intervals, in particular every week. Here, on the one hand, the pump itself is tested, and, on the other hand, the starting device is tested, which serves to start the pump during the test run. This starting device usually comprises one or more, in particular two, pressure switches in the distribution pipe. Here, in particular the pressure at which the pump starts is tested.

The control unit may also be configured to perform the test run of the pump at a time other than the usual interval on account of external circumstances such as error messages, past fire events or similar. The control unit is thus configured to determine when a test run of the pump is appropriate and when it may be omitted. This makes it much easier to check the pump.

In a further embodiment of the invention, the control unit is configured to abort the automatic test run of the pump and to close the test line by means of the closing element when the water extinguishing system is triggered.

The control unit is preferably configured to actively and automatically interrupt the test run of the pump if the water extinguishing system is triggered, which is usually due to a fire event. In this embodiment, the control unit itself may also be used directly to activate the closing element and thus interrupt the supply of extinguishing water to the test line.

In one embodiment, the control unit is configured to release the fluid flow through the distribution pipe by means of the distribution pipe shutter when the water extinguishing system is triggered.

As already mentioned, in some water extinguishing systems it may be necessary to interrupt the fluid flow through the distribution pipe by means of a distribution pipe shutter. If this is the case, it is necessary to release this fluid connection again through the distribution pipe as quickly as possible in the event of fire. In particular the control unit can be used for this purpose, which is configured to cause not only the closing element in the test line to shut off the test line, but also to cause the closing element in the distribution pipe to release the distribution pipe.

In a further aspect, the invention relates to a control unit for controlling an automatic test run of the pump of a water extinguishing system, in particular a water extinguishing system as described above, where the control unit is configured:
  to start an automatic test run of the pump,
  to receive a trigger signal indicative of a triggering of the water extinguishing system, and
  to abort the test run of the pump by controlling a closing element of the test line when the trigger signal is received.

The present invention also relates to the above-mentioned control unit, which serves to control—automatically—the test run of the pump for a water extinguishing system. For this purpose, the control unit is in particular configured to initiate the test run of the pump at predetermined intervals and/or upon input from a user. The test run of the pump is initiated by the control unit controlling the opening element which is arranged in the test line. This moves the opening element into the opening position. In the opening position, the extinguishing fluid from the fluid supply can enter the test line and the test run of the pump can be carried out. For this purpose, the pressure at the pump starting device is first reduced to initiate the test run of the pump. This reduction can be effected in particular by the control unit. The pressure drop then causes the pump to start. Subsequently, the operating parameters of the pump can be recorded in a known manner. After successful completion of the test run, the opening element is then closed again and the pump is switched off, in particular by means of a corresponding control command.

The control unit may further be configured to register a triggering of the water extinguishing system. For this purpose, the control unit can in particular receive a trigger signal indicating that the water extinguishing system has been triggered. This signal can be transmitted by the FACU. In response to receiving the trigger signal, the control unit can then control the closing element such that the closing element is moved to the locking position and the test run of the pump is thus terminated.

Alternatively or additionally, the test run may also be aborted by means of the trigger switch, where the trigger switch may be arranged downstream of the junction or at the alarm valve. For this purpose, the control unit is preferably configured to output via a signal line a signal that keeps the closing element in the unlocking position. When the water extinguishing system is triggered, the pressure, flow rate and similar parameters change within the pipe network. The trigger switch is configured to switch in response to this change. This switching causes an interruption of the signal between the control unit and the closing element, thus moving the closing element into the locking position.

In a preferred embodiment, the control unit is further configured:
  to control a distribution pipe shutter in a distribution pipe of the water extinguishing system, where the distribution pipe shutter is configured to interrupt a fluid flow through the distribution pipe in response to the control, and
  to control the distribution pipe shutter of the pump again, where the distribution pipe shutter is configured to release in response to the renewed control the fluid flow through a distribution pipe of the water extinguishing system again.

In some embodiments, the control unit is configured to also control the distribution pipe shutter, thus moving it from the flow position into the shut-off position and back. For this purpose, the control unit is preferably in signal connection with the distribution pipe shutter and outputs a corresponding signal to the distribution pipe shutter when the test run of the pump is to be activated. In response to this signal, the distribution pipe shutter moves into the shut-off position, such that no more fluid can flow through the distribution pipe.

Furthermore, the control unit is configured to transmit a new signal via the signal connection that causes the distribution pipe shutter to move from the shut-off position into the flow position, thus releasing the fluid flow through the distribution pipe again. On the one hand, this new signal can be transmitted by the control unit if the test run has been successfully completed. On the other hand, the control unit may also be configured to control the distribution pipe shutter in response to the trigger signal—i.e. if the test run is aborted—in order to release the fluid flow accordingly if the water extinguishing system is triggered.

Alternatively or additionally, the distribution pipe shutter can also be deactivated by means of the trigger switch. For this purpose, the control unit is preferably configured to output via a signal connection a signal which keeps the distribution pipe shutter in the shut-off position. When the trigger switch is switched, this signal is interrupted and the distribution pipe shutter moves to the flow position, which enables the fluid flow through the distribution pipe.

In one embodiment, the control unit is further configured to store and evaluate measured values of at least one sensor arranged in or at the test line. During the pump test run, various parameters of the pump and the fluid flow within the test line can be determined to check the functionality of the pump. For this purpose, one or more sensors are preferably arranged within or at the inner or outer wall of the test line and/or the pump.

Such a sensor may in particular be a vibration sensor for measuring the state of the pump, a pressure sensor for determining the pressure within the test line and/or a volume flow sensor for determining the volume flow through the test line.

The measured values determined by these sensors and devices can be transmitted to the control unit via corresponding signal connections. The control unit preferably comprises at least one memory and one evaluation unit for this purpose. The measured values can be stored temporarily and/or permanently within the memory. Furthermore, the measured values are transmitted to the evaluation unit. The evaluation unit evaluates the individual measured values and outputs the result of this evaluation. The result may be in the form of a graphical output, which allows a user to check the state of the tested pump him- or herself. Alternatively or additionally, the output may also be configured in such a way that the result of the evaluation comprises a simple "Pump State OK"/"Pump State Not OK" and corresponding details are only displayed after the user makes an explicit selection.

In a further aspect, the present invention further relates to a fire reporting and/or extinguishing control center which is configured to control a closing element for closing the test line when a fire is detected, where such closing element is arranged in a test line of the water extinguishing system as described above.

In a further aspect, a fire reporting and/or extinguishing control center (FACU—fire alarm control unit) is provided which is configured to activate the closing element as soon as the water extinguishing system is triggered. For this purpose, the FACU can either communicate directly with the closing element or such communication can take place via the control unit. The communicative connection between the closing element and the FACU can be implemented as a signal line, with the control unit being interposed, if necessary. The FACU is in particular configured to generate an activation signal in addition to the trigger signal for triggering the water extinguishing system and to transmit this activation signal to the closing element. In response to this activation signal, the closing element is activated, thus immediately shutting off the supply to the test line.

In accordance with an extension of this aspect according to the invention, the fire reporting and/or extinguishing control center may also be configured to control a distribution pipe shutter arranged in a distribution pipe of the water extinguishing system to release a fluid flow through the distribution pipe.

In this embodiment, the distribution pipe shutter can also be moved by the FACU from the flow position into the shut-off position and back, if necessary by means of a corresponding control unit.

The invention further relates to a method for controlling a water extinguishing system, in particular a water extinguishing system as described above, comprising carrying out a test run of a pump of the water extinguishing system, where the method comprises the following steps:
  starting the test run of the pump,
  receiving a trigger signal indicative of a triggering of the water extinguishing system, and
  aborting the test run of the pump by controlling a closing element in the test line when the trigger signal is received.

According to an embodiment, the method further comprises controlling a distribution pipe shutter in a distribution pipe of the water extinguishing system to interrupt a fluid flow through the distribution pipe, and controlling the distribution pipe shutter again to release the fluid flow through a distribution pipe again. According to another embodiment, starting the test run comprises controlling an opening element of a test line to automatically start the test run of the pump. According to another embodiment, the method further comprises storing and evaluating measured values of at least one sensor arranged in or at the test line.

In some embodiments, this method is carried out in particular by the control unit as described above. Here, the control of the water extinguishing system comprises in particular starting and carrying out the test run for the pump.

Here, the test run of the pump can be started in particular automatically by controlling the opening element arranged in the test line, where such controlling is preferably done by the control unit. This moves the opening element into the opening position. Subsequently, the pressure at the pump starting device is reduced. This reduction can also be effected in particular by the control unit. The pressure drop then causes the pump to start. Subsequently, the operating parameters of the pump can be recorded. After successful completion of the test run, the opening element is then closed again and the pump is switched off by means of a corresponding control command.

The test run of the pump is preferably initiated at predetermined intervals and/or in response to a user input.

The test run of the pump can then be carried out until the nominal operational values are reached. However, if a trigger signal is received during the test run of the pump, which indicates that the water extinguishing system is triggered, the test run of the pump is aborted. This trigger signal may have been generated in particular by a FACU or indicated by the trigger switch, as described above. Here, the test run of the pump is aborted by activating the closing element, thus bringing the closing element into the locking position and thereby preventing extinguishing water from continuing to enter the test line. The extinguishing water is then completely available to the water extinguishing system. In addition, aborting the test run may also comprise deactivating the distribution pipe shutter in the distribution pipe.

BRIEF DESCRIPTION OF THE DRAWINGS

The invention is described in more detail below with reference to the attached figures and using preferred embodiment examples. The figures show.

MODE(S) FOR CARRYING OUT THE INVENTION

Figure 1:
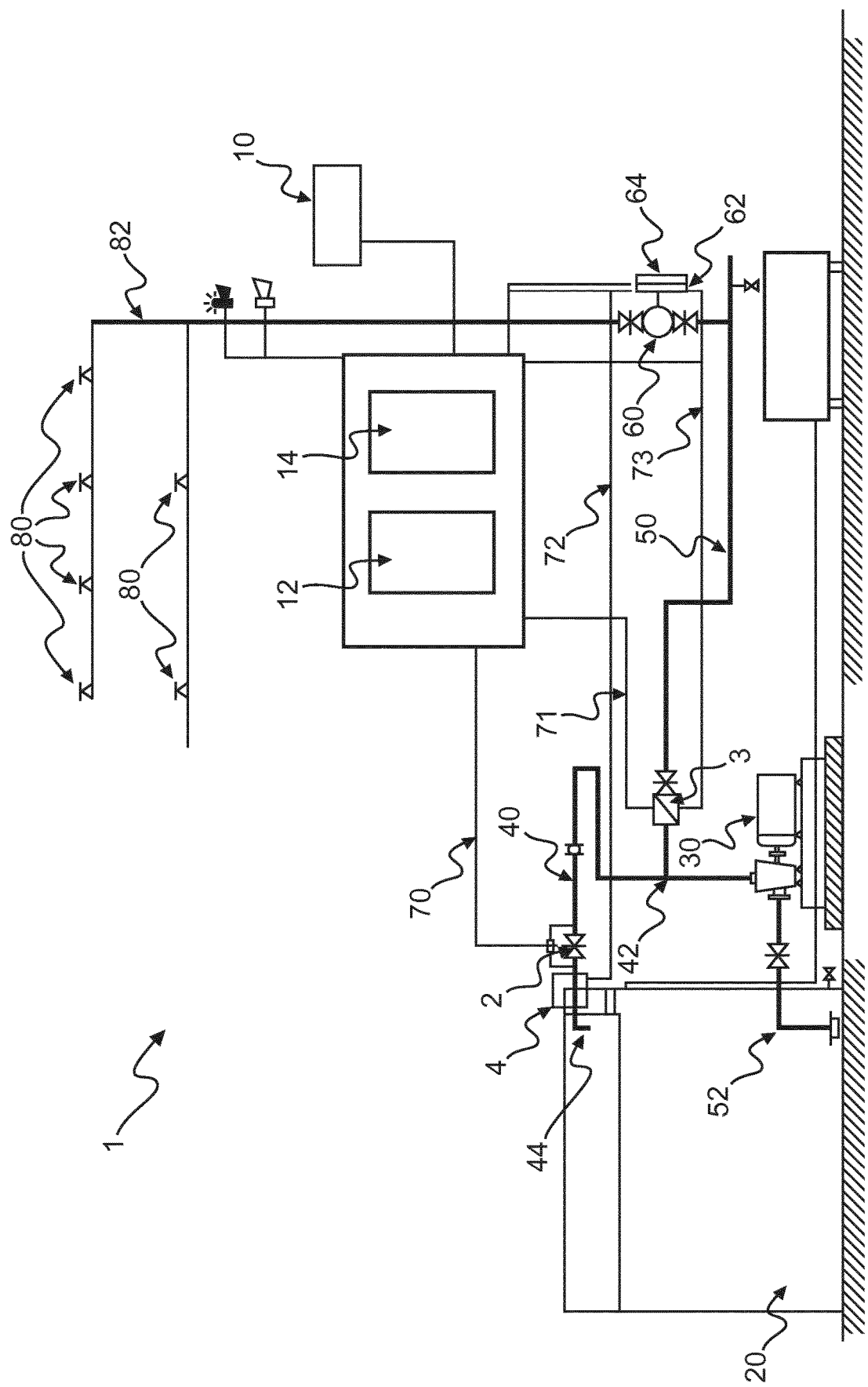
FIG. 1 a schematic diagram of a water extinguishing system according to a preferred embodiment.

FIG. 1 shows a water extinguishing system 1 according to a preferred embodiment of the invention. In this embodiment, the water extinguishing system 1 is a sprinkler system comprising a plurality of sprinklers 80 which are supplied with extinguishing fluid via a pipe network 82.

The extinguishing fluid is provided by a fluid supply, which in the exemplary embodiment of FIG. 1 is designed as the reservoir tank 20. A suction line 52 is used to pump the extinguishing fluid present in the storage tank 20 out of this storage tank 20 same by means of the pump 30, which is designed as a sprinkler pump.

From the pump 30 a distribution pipe 50 extends, which comprises a test line junction 42, at which the test line 40 branches off from the distribution pipe 50. The test line 40 has a return flow 44 at its end facing away from the test line junction 42, through which the extinguishing fluid can be returned to the reservoir tank 20 during the test run of the pump.

An opening element 2 and a closing element 4 are also arranged along the test line 40 between the junction 42 and the return flow 44. In the energetically favorable base state, the closing element 4 is activated, i.e. it is in a position in which it does lock the fluid flow through the test line 40. The opening element 2, on the other hand, is closed in its energetically favorable base state, in which no test run of the pump is carried out, and thus locks the flow through test line 40.

The distribution pipe 50 leads to the alarm valve 60, which in this embodiment is designed as a wet alarm valve. The alarm valve 60 further comprises a first pressure switch 62 and a second pressure switch 64, which are in signal communication with a central unit comprising among others a control unit 12 and a sprinkler monitoring center 14. The central unit is in turn in signal connection with the fire reporting and/or extinguishing control center (FACU—fire alarm control unit) 10.

In the normal state, i.e. in the state in which the water extinguishing system 1 is not triggered, the alarm valve 60 locks the connection between the distribution pipe 50 and the pipe network 82 comprising the plurality of sprinklers 80. In the exemplary embodiment of FIG. 1, the distribution pipe 50 also comprises a distribution pipe shutter 3. The distribution pipe shutter 3 can be moved back and forth between a flow position and a shut-off position. In the flow position, the distribution pipe shutter 3 is arranged to allow fluid to flow through the distribution pipe 50 to the alarm valve 60. In the shut-off position, the distribution pipe shutter 3 is configured to interrupt the fluid flow through the distribution pipe 50 to the alarm valve. The distribution pipe shutter 3 is configured in such a way that it is in the flow position when it is in the energetically favorable base state, such that a fluid flow through the distribution pipe 50 is possible.

The water extinguishing system 1 comprises a control unit 12, which is used to control the test run of the pump. In the exemplary embodiment of FIG. 1, the control unit 12, together with the sprinkler monitoring center 14, is part of a central unit which is arranged externally of the FACU 10. In some embodiments, the control unit 12 may also be designed as part of the FACU 10. In some embodiments, the control unit 12 may also be designed as a separate element that is spatially separated from the FACU 10 and/or the sprinkler monitoring center 14.

According to the invention, an automated test run of the pump can be carried out in the water extinguishing system 1. For this purpose, the control unit 12 generates a corresponding control signal and outputs this control signal via the signal connection 70 to the opening element 2. In response to the control signal, the opening element 2 moves from a closing position, in which it locks the fluid flow through the test line 40, to the opening position, in which there is a fluid flow through the test line 40.

In the embodiment of FIG. 1, this opening is performed by means of a motorized slide valve, which the control signal has caused to move the opening element from the closing position into the opening position. Opening the opening element 2 allows the extinguishing fluid to flow from the junction 42, through the test line 40 to the return flow 44 into the reservoir tank 20.

In the exemplary embodiment of FIG. 1, the control unit 12 also outputs a control signal via the signal line 71 to the distribution pipe shutter 3. In response to the control signal the distribution pipe shutter 3 moves from the flow position into the shut-off position, thus shutting off the fluid flow through the distribution pipe 50 in the direction of the alarm valve 60.

Furthermore, by reducing the pressure at the pump starting device (not shown in FIG. 1), the control unit 12 initiates a start of the pump 30 for the purpose of a test run of the pump 30. The pump 30 is therefore started. The starting pressure, which is the pressure at the time the pump 30 is started, is then measured and recorded and the pump test run is carried out until the normal operating parameters of the drive motor of the pump 30 are reached. Then the opening element 2 is moved from the opening position into the closing position by means of a corresponding control signal via the signal line 70, thus locking the fluid flow through the test line 40. This means that no further extinguishing fluid can enter the test line 40. The control unit 12 can switch off the pump again by means of a further signal.

At the same time, the control unit 12 also transmits a signal via the signal line 71 to the distribution pipe shutter 3, which moves from the shut-off position into the flow position in response to this signal, thus allowing fluid to flow through the distribution pipe 50 in the direction of the alarm valve 60.

If, during such a test run of the pump 30, a triggering of the water extinguishing system 1 occurs, in which the extinguishing fluid is conducted through the pipe network 82 to the plurality of sprinklers 80, the present invention enables the test run of the pump 30 to be switched off immediately. According to the invention, closing element 4 is provided for this purpose, which is configured to close the pump test circuit immediately such that no more extinguishing fluid can flow into the circuit.

In the preferred embodiment according to FIG. 1, the closing element 4 is activated by a trigger switch, which is realized here as the first pressure switch 62. This is achieved by moving the closing element from its energetically favorable base state (the locking position) to the unlocking position and holding it in this unlocking position by applying a corresponding signal from the control unit via the signal line 72 when starting the test run of the pump. The first pressure switch 62 switches due to the pressure drop caused by the triggering of the water extinguishing system 1. The first pressure switch 62 is communicatively connected to the signal line 72. When the first pressure switch switches, the signal flow via the signal line 72 is interrupted. This means that the closing element 4 is no longer held in the unlocking position. In response to the activation of the pressure switch, the closing element 4 thus moves into the locking position. This immediately terminates the test run of the pump and the extinguishing fluid and the functionality of the pump 30 are fully available for the extinguishing process.

Since, in the exemplary embodiment of FIG. 1, during the test run the fluid flow through the distribution pipe 50 is also interrupted by the distribution pipe shutter 3 during the test run of the pump, a signal is transmitted here from the control unit via the signal line 73 to the distribution pipe shutter 3. This signal causes the distribution pipe shutter 3 to move from its energetically favorable flow position into the shut-off position and holds the distribution pipe shutter 3 in this position. When the pressure switch 62 switches, the signal via the signal line 73 is interrupted. This causes the distribution pipe shutter to move back into the flow position. In this way, the fluid flow through the distribution pipe 50 is released.

Figure 2:
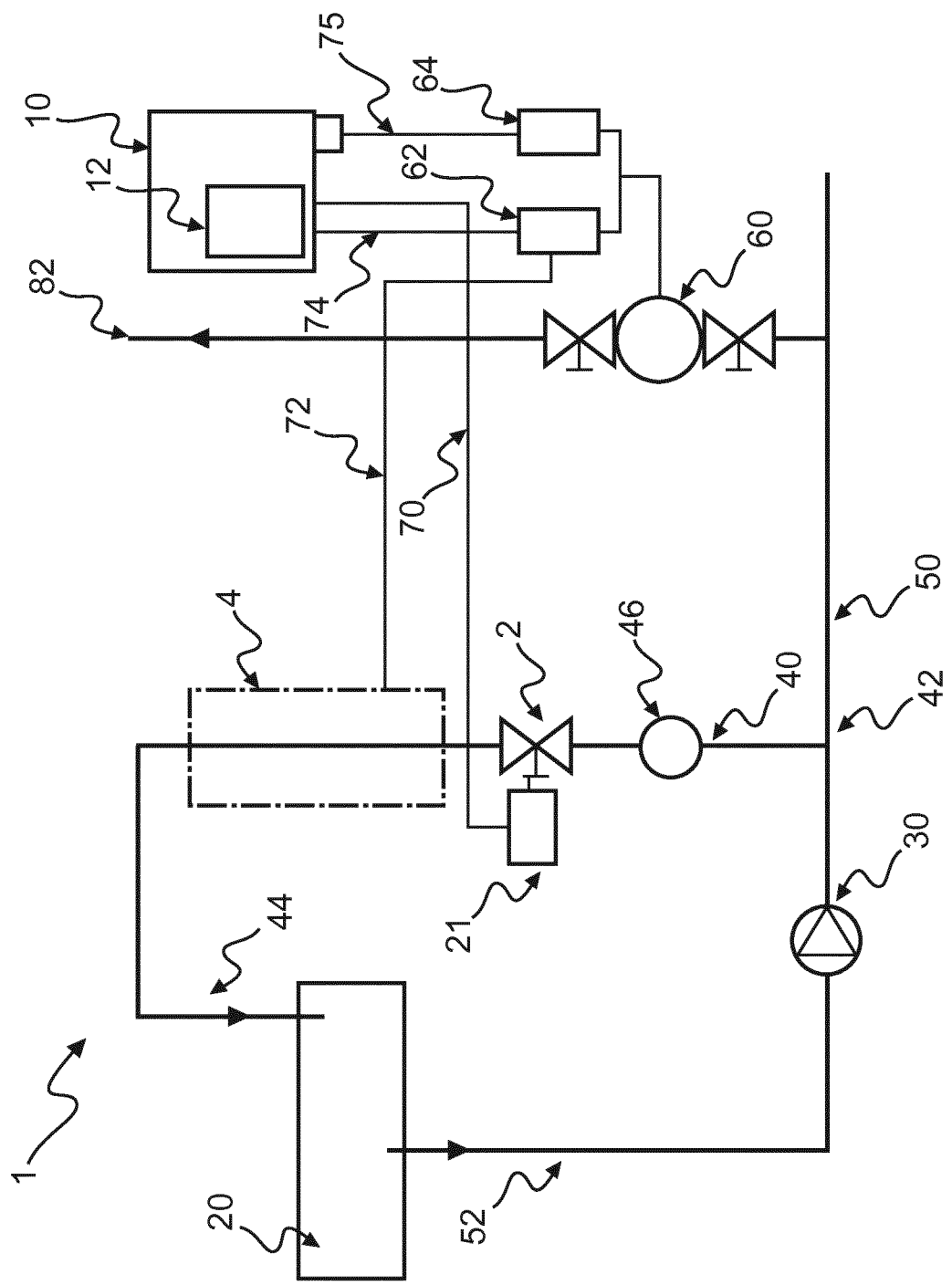
FIG. 2 a schematic diagram of a section of a water extinguishing system according to a preferred embodiment.

FIG. 2 schematically shows a section of a water extinguishing system 1 according to the invention according to a preferred embodiment. As already described in connection with FIG. 1, the water extinguishing system 1 comprises a reservoir tank 20, which is connected to the pump 30 via a suction line 52. The pump 30 is used to pump the extinguishing fluid via the suction line 52 into the distribution pipe 50. The distribution pipe 50 comprises a test line junction 42, at which the test line 40 branches off from the distribution pipe 50.

A sensor 46 is arranged along the test line 40 between the junction 42 and the return flow 44. In the exemplary embodiment of FIG. 2, this sensor 46 is designed as a flow meter, which serves to determine the flow through the test line 40 during the test run of the pump 30. The flow meter 46 is connected via a signal line (not shown) to an evaluation unit which evaluates the measured values determined by the flow meter 46 and outputs them to a user.

Furthermore, the opening element 2 and the closing element 4 are arranged along the test line 40.

The distribution pipe 50 connects the pump 30 to the alarm valve 60, which has a first pressure switch 62, which acts as a trigger switch in the exemplary embodiment of FIG. 2, and a second pressure switch 64. The first pressure switch is connected via a signal line 74 to a control unit 12 within the FACU 10 and via a signal line 72 to the closing element 4, i.e. it is arranged along the signal line 72, 74 between the closing element 4 and the control unit 12. The inclusion of the control unit 12 in the FACU 10 is a purely spatial one. In other embodiments of the water extinguishing system according to the invention, the control unit 12 may also be provided separated from the FACU 10. The second pressure switch 64 is connected to the alarm of the water extinguishing system 1 via an alarm line 75.

The control unit 12 within the FACU 10 is connected via a signal line 70 to a motor 21 of the opening element 2. When starting the test run of the pump, the control unit 12 transmits a signal via the signal line 70 to the motor 21, which then moves the opening element 2 into the opening position. Furthermore, the control unit 12 transmits a signal to the pump starting device to start the pump, as described above. At the end of the test run of the pump 30, the control unit transmits a signal to the pump to deactivate it. Furthermore, the control unit again transmits a signal to the motor 21 via the signal line 70. In response to this signal, the motor 21 moves the opening element 2 back into the closing position.

The first pressure switch 62 also has a signal line 72 to the closing element 4. If, during the test run of the pump 30, the water extinguishing system is triggered as described in connection with FIG. 1, the first pressure switch 62 interrupts a signal which is transmitted via the signal lines 72 and 74 from the control unit to the closing element 4 in order to keep the closing element 4 in the unlocking position. This interruption activates the closing element 4, i.e. it moves from the unlocking to the locking position and thus immediately interrupts the test run of the pump such that all the extinguishing fluid is available for the water extinguishing system 1.

Figure 3:
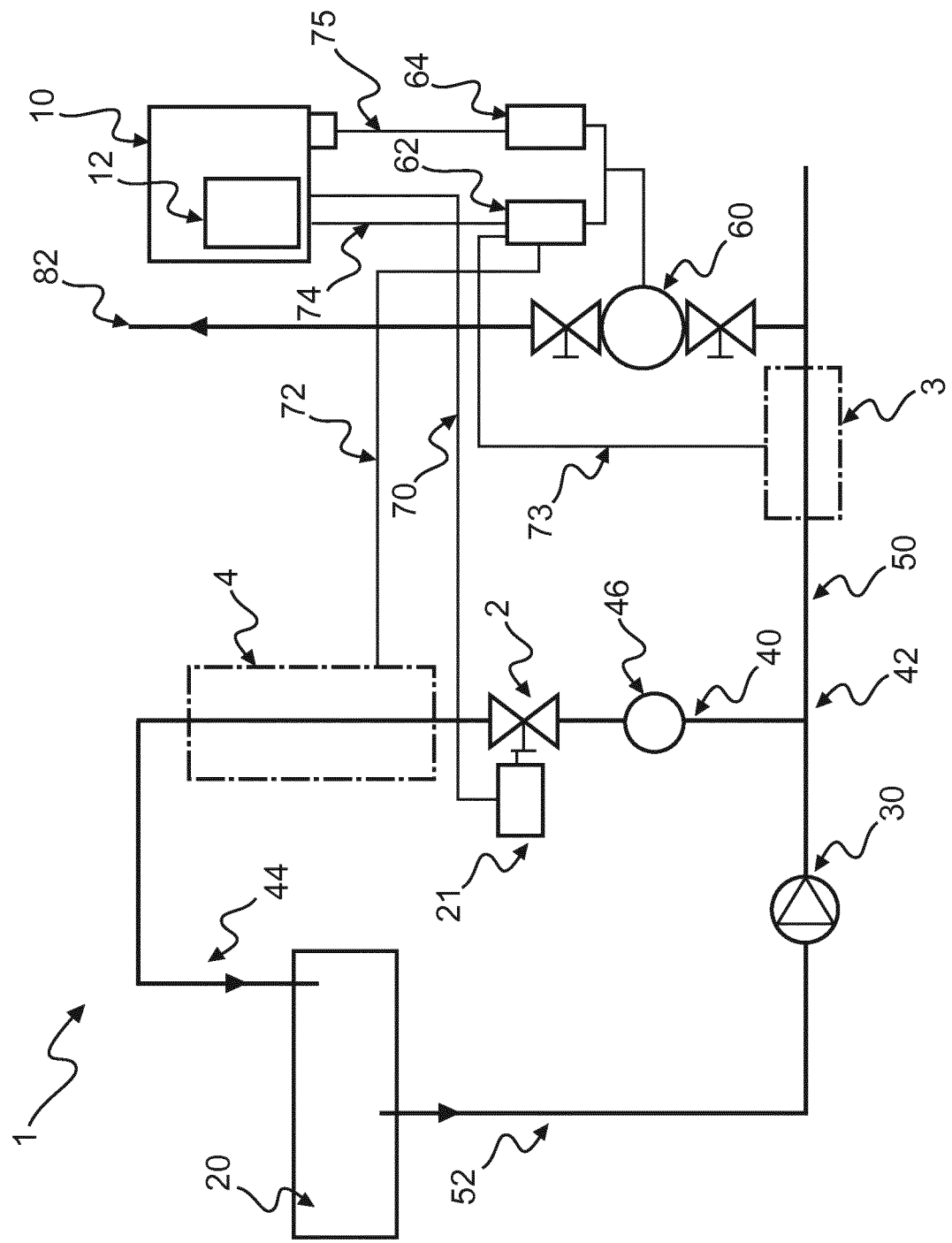
FIG. 3 a modification of the water extinguishing system according to FIG. 2.

FIG. 3 schematically shows a modification of the embodiment of FIG. 2. Therefore, the structure according to FIG. 3 corresponds mostly to that of FIG. 2. At this point, identical reference numbers mean in particular identical elements of the invention.

The embodiment of FIG. 3 differs from that of FIG. 2 only in that a distribution pipe shutter 3 is also arranged in the distribution pipe 50, which element is configured to interrupt the fluid flow through the distribution pipe 50 during the test run of the pump 30. This means that in the event of a pump test run, a signal is transmitted via signal lines 73 and 74 to the distribution pipe shutter 3, which causes the distribution pipe shutter 3 to move from the flow position into the shut-off position, thus interrupting the fluid flow through the distribution pipe 50 to the alarm valve 60. The signal then holds the distribution pipe shutter 3 in the shut-off position, as already described. When the test run of the pump is completed, the signal via signal lines 73 and 73 is interrupted, causing the distribution pipe shutter 3 to move back into the energetically preferred flow position.

If the water extinguishing system 1 is triggered during the test run of pump 30, this causes a pressure drop within the pipe network. Here the pressure switch 62, which in the embodiment of FIG. 3 serves as a trigger switch, switches in response to the drop in pressure within the pipe network. This switching interrupts the signal which is transmitted via signal lines 73 and 74, thus causing the distribution pipe shutter 3 to move into the energetically more favorable flow position.

Figure 4:
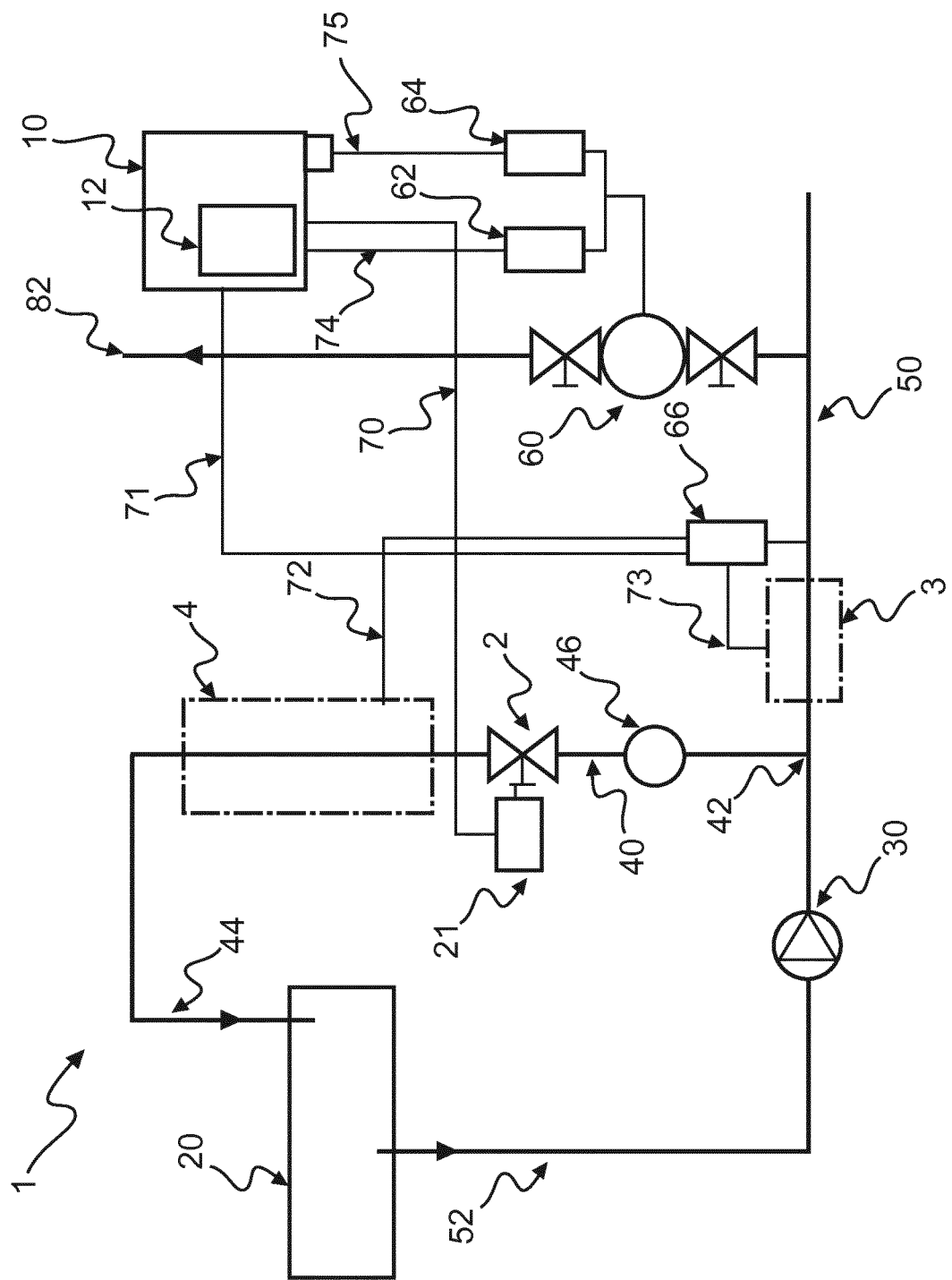
FIG. 4 a schematic diagram of a section of a water extinguishing system according to another preferred embodiment.

FIG. 4 schematically shows a further embodiment of the invention. Here, the structure according to FIG. 4 mostly corresponds to that of FIGS. 2 and 3. At this point, identical reference numbers mean in particular identical elements of the invention. The embodiment of FIG. 4 differs from that of FIG. 2 only in that the trigger switch, which in the event of a triggering of the water extinguishing system 1 interrupts the signals for holding the closing element 4 in the opening position and for holding the distribution pipe shutter 3 in the shut-off position, is not realized by one of the pressure switches 62 and 64, which are arranged at the alarm valve 60, but by an additional, dedicated trigger switch 66, which is arranged directly at the distribution pipe 50. This trigger switch 66 may be designed in particular as a pressure switch. Alternatively, the trigger switch may also be designed as a flow switch or similar. Here, the pressure switch 66 is interposed in the connection between the control unit 12 and the closing element 4 via the signal lines 71 and 72 and in the connection between the control unit 12 and the distribution pipe shutter 3 via the signal lines 71 and 73.

In case the water extinguishing system 1 is triggered, the pressure switch 66 switches due to the pressure drop in the pipe network, and accordingly in the distribution pipe 50. The switching of the pressure switch 66 causes an interruption of the signal which is transmitted via the signal lines 71 and 72 to the closing element 4. In response to this interruption, the closing element 4 moves from the unlocking position into the energetically more favorable locking position and thus interrupts the supply of extinguishing fluid to the test line 40. Furthermore, switching the pressure switch 66 causes an interruption of the signal which is transmitted via the signal lines 71 and 73 to the distribution pipe shutter 3. In response to this, the distribution pipe shutter 3 moves from the shut-off position into the energetically more favorable flow position, thus releasing the supply of extinguishing fluid to the distribution pipe 50. This means that the extinguishing fluid is completely available to the distribution pipe 50 and the pipe network 82.

Figure 5:
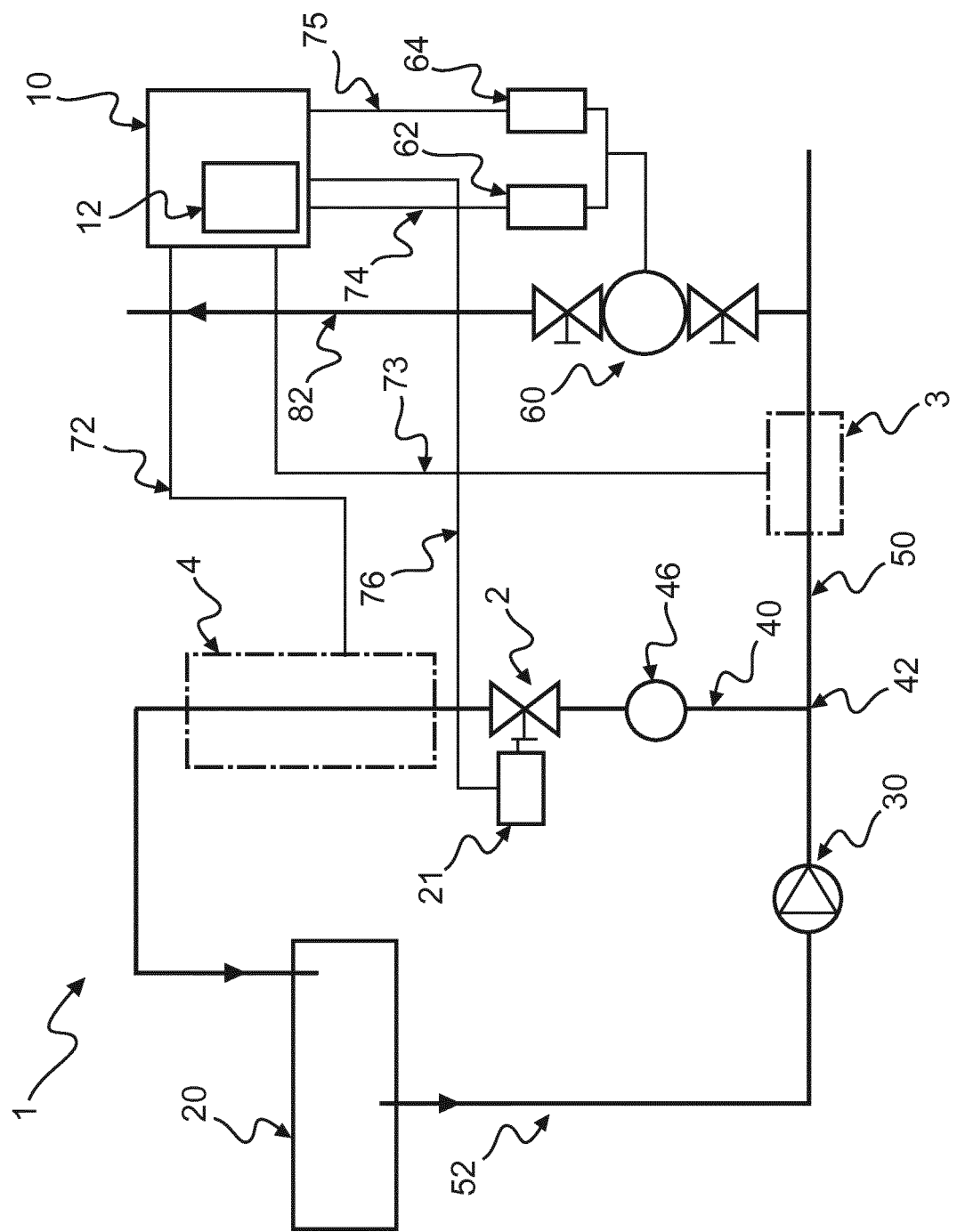
FIG. 5 a schematic diagram of a section of a water extinguishing system according to yet another preferred embodiment.

FIG. 5 schematically shows a section of a water extinguishing system 1 according to another embodiment. Here, again, identical elements are designated with identical reference numbers. In contrast to the embodiments of FIGS. 2 to 4, the signals for activating the closing element 4 and for deactivating the distribution pipe shutter 3 are not generated by a trigger switch, but by the control unit 12 in the fire reporting and/or extinguishing control center (FACU—fire alarm control unit) 10, and are then transmitted to the closing element 4 and the distribution pipe shutter 3.

In this embodiment, the FACU 10 preferably receives a fire detection signal. This fire detection signal can be output by one or more fire detectors, which, with the use of corresponding sensors, can determine one or more fire parameters and detect a fire based on such fire parameters. If the FACU 10 receives such a fire detection signal, the FACU 10 initiates several operations. The FACU 10 triggers the water extinguishing system. In the embodiment of FIG. 5, the FACU 10 also informs the control unit 12 about the triggering. The control unit 12 then generates a signal to activate the closing element 4 and a signal to deactivate the distribution pipe shutter 3. The signal for activating the closing element 4 is transmitted from the control unit 12 arranged within the FACU 10 to the closing element 4 via the signal line 72. In response to the signal, the closing element 4 moves from the unlocking to the locking position, thus immediately closing the supply to the pump test circuit. The signal for deactivating the distribution pipe shutter is transmitted from the control unit 12 in the FACU 10 to the distribution pipe shutter 3 via the signal line 73. In response to the signal, the distribution pipe shutter 3 moves from the shut-off position into the flow position, thus releasing the fluid flow through the distribution pipe 50 to the alarm valve 60.

The control unit 12 can in principle generate a signal to activate the closing element 4 and a signal to deactivate the distribution pipe shutter 5 and output them accordingly, such that the closing element 4 is normally activated and the distribution pipe shutter 3 is normally deactivated as soon as the water extinguishing system 1 triggers. In some embodiments, the control unit 12 can also determine first, for example by means of a corresponding test signal, whether a test run of the pump is being carried out at the given time, and only output corresponding signals if a test run of the pump is being carried out. In this case, the closing element 4 and the distribution pipe shutter 3 are thus only activated if it is actually necessary. If no test run of the pump was in progress at the given time, no controlling takes place.

Even if in connection with FIG. 5, it is the control unit 12 which generates and outputs the signals, in other embodiments such signals may also be output by the FACU 10. In addition, the control unit 12, which in FIG. 5 is arranged within the FACU 10, may also be arranged outside of the FACU 10. Furthermore, embodiments are conceivable in which a signal (to the closing element 4 or the distribution pipe shutter 3) is output by the FACU 10 and/or the control unit 12. Further modifications are also conceivable.

Figure 6:
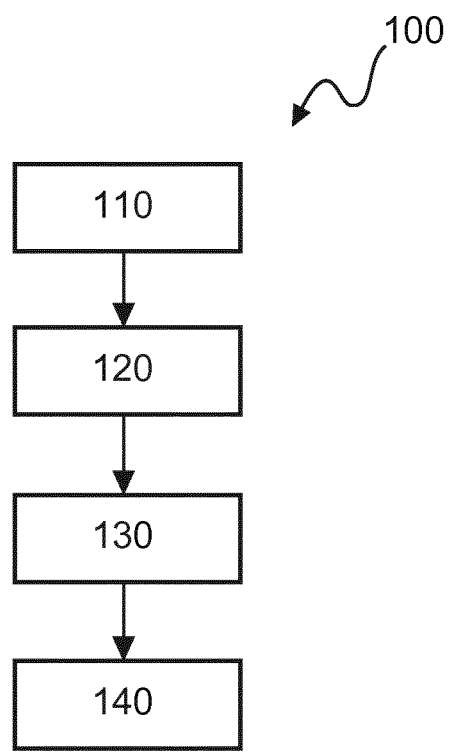
FIG. 6 a flow chart for a method for controlling a water extinguishing system in according to the invention.

FIG. 6 shows a flow chart for a method for controlling a water extinguishing system 100 according to the invention. In particular, FIG. 6 shows a method for carrying out an automated test run of the pump 30, in particular a sprinkler pump, in a water extinguishing system 1.

In step 110, the test run of the pump is initiated. For this purpose, the opening element 2 within the test line 40 is opened. In the specific embodiment of FIG. 6, the opening element within the test line 40 is controlled in order to open said opening element. This control is preferably effected by the control unit 12. The control unit 12 causes the opening element 2 to move from the locking position into the opening position. This opens the test circuit, which is formed by the reservoir tank 20, the suction line 52 and the test line 40. Then the water pressure is reduced at the pump starting device. This reduction can also be effected in particular by the control unit. The pressure drop then causes the pump to start. Furthermore, the control unit 12 may be configured to control a distribution pipe shutter 3, if a distribution pipe shutter 3 is present within the water extinguishing system, to move the distribution pipe shutter 3 from the flow position into the shut-off position. In some embodiments, the distribution pipe can also be closed manually by means of the distribution pipe shutter 3 at the beginning of the test run of the pump 30.

In step 120, measured values are determined by means of corresponding sensors and measuring devices, such as a pressure sensor or a volume flow measuring device, and sent to the control unit 12, thus making it possible to determine the state of the pump being tested. These measured values are stored and evaluated in the control unit 12. The evaluated measurement results are then output to a user who can use them to evaluate the test run.

In step 130, the control unit 12 receives a trigger signal indicating that the water extinguishing system was triggered. In response to this trigger signal, the control unit 12 generates a signal to activate the closing element 4 and a signal to deactivate the distribution pipe shutter 3. These signals are transmitted accordingly to the closing element 4 and the distribution pipe shutter. In response to receiving the signal, the closing element 4 locks the fluid flow through the test line 40 and thus the fluid flow within the test circuit. In response to the signal, the distribution pipe shutter 3 moves from the shut-off position into the flow position, thus releasing the fluid flow through the distribution pipe 50 to the alarm valve 60. This means that in the event of a fire, the test run of the pump 30 can be terminated immediately and in a fully automatic manner, where the extinguishing fluid is completely available to the distribution pipe 50 and the pipe network 82 and can thus be used for the extinguishing process.

In the specific embodiment of FIG. 6, the control unit 12 generates the signal for activating the closing element 4 and for deactivating the distribution pipe shutter 3. In other embodiments, however, these signals may also be generated completely or partially by other elements, such as the FACU 10. In further other embodiments, the activation of the closing element 4 and/or the deactivation of the distribution pipe shutter 3 may also be activated by means of the trigger switch, as described above. The functionality of the control unit, to evaluate and store the measured values determined by the one or more sensors, is not affected by this.

Other possible combinations and embodiments of the invention are conceivable and for the person skilled in the art result directly from the previous context.

LIST OF UTILIZED REFERENCE NUMBERS 1 water extinguishing system
2 opening element
3 distribution pipe shutter
4 closing element
10 fire reporting and/or extinguishing control center (FACU—fire alarm control unit)
12 control unit
14 sprinkler monitoring center
20 fluid supply
21 motorized slide valve opening element
30 pump
40 test line
42 test line junction
44 return flow into the fluid supply
46 sensor
50 distribution pipe
52 suction line
60 alarm valve
62, 66 trigger switch
64 second pressure switch
70 signal line
71 signal line
72 signal line
73 signal line
74 signal line
75 alarm line
76 signal line
80 sprinkler
82 pipe network
100 method for controlling a water extinguishing system
110 initiating the test run of the pump
120 storing and evaluating measured values
130 receiving a trigger signal
140 aborting the test run of the pump

The invention claimed is:

1. A method for controlling a water extinguishing system, the water extinguishing system having a fluid supply for providing an extinguishing fluid; a pump which is configured to pump the extinguishing fluid from the fluid supply into a distribution pipe, and a test line which branches off from the distribution pipe and is configured to conduct the extinguishing fluid pumped by the pump to the fluid supply, the test line having:
    an opening element manually and/or signal controlled to open the test line during a test run of the pump and close the test line after completion of the test run of the pump; and
    a closing element signal controlled to open the test line during the test run of the pump and to close the test line if the water extinguishing system is triggered,
    the method for controlling the water extinguishing system comprising carrying out a test run of the pump of the water extinguishing system, wherein the method comprises the following steps:
    starting the test run of the pump,
    receiving a trigger signal indicative of a triggering of the water extinguishing system in response to a detection of a fire, and
    aborting the test run by controlling the closing element in the test line when the trigger signal is received.

2. The method according to claim 1, further comprising controlling a distribution pipe shutter in the distribution pipe of the water extinguishing system to interrupt a fluid flow through the distribution pipe, and
controlling the distribution pipe shutter again to release the fluid flow through the distribution pipe again.

3. The method according to claim 1, wherein starting the test run comprises controlling the opening element of the test line.

4. The method according to claim 3, further comprising: storing and evaluating measured values of at least one sensor arranged in or at the test line.

5. The method according to claim 1, wherein the aborting the test run by controlling the closing element comprises moving the closing element from an unlocking position into a locking position in which the closing element closes the test line.

6. The method according to claim 5, wherein the aborting the test run by controlling the closing element further comprises moving the opening element from an open position to a locking position.

7. The method according to claim 5, wherein the locking position of the closing element corresponds to an energetically favorable home position of the closing element.

8. The method according to claim 1, wherein the moving of the closing element comprises automatically controlling the closing element.

9. The method according to claim 8, wherein the moving of the opening element comprises automatically controlling the opening element.

10. The method according to claim 2, wherein the controlling of the distribution pipe shutter comprises automatically controlling the distribution pipe shutter.

11. The method according to claim 3, wherein the controlling of the opening element comprises manually controlling the opening element.

12. The method according to claim 3, wherein the controlling of the opening element comprises automatically controlling the opening element.

13. The method according to claim 1, wherein the receiving a trigger signal comprises providing a signal from a trigger switch.

14. The method according to claim 13, wherein the trigger switch comprises a trigger switch of an alarm valve.

15. The method according to claim 13, wherein the trigger switch is disposed at the distribution pipe downstream a junction of the test line and the distribution pipe.

16. The method according to claim 1, wherein the water extinguishing system further comprises a fire reporting and/or extinguishing control center, wherein the fire reporting and/or extinguishing control center provides the trigger signal.

17. The method according to claim 2, wherein the closing element and/or the distribution pipe shutter is provided with at least one of the following closing devices: a deluge valve, a pilot-controlled solenoid valve, a directly controlled solenoid valve, and a fail-safe motorized slide valve.

18. The method according to claim 1, wherein the water extinguishing system further comprises a control unit configured to control an automatic test run of the pump.

19. The method according to claim 18, wherein the control unit is configured to abort the automatic test run.

20. The method according to claim 19, wherein the control unit is configured to release the fluid flow through the distribution pipe by the distribution pipe shutter.

* * * * *